US012384689B2

(12) United States Patent
Mamuye et al.

(10) Patent No.: US 12,384,689 B2
(45) Date of Patent: Aug. 12, 2025

(54) LOW VACANCY Fe-SUBSTITUTED Mn-BASED PRUSSIAN BLUE ANALOGUE

(71) Applicant: Natron Energy, Inc., Santa Clara, CA (US)

(72) Inventors: Ashenafi Damtew Mamuye, Milpitas, CA (US); Daniel Friebel, San Carlos, CA (US); Aniruddh Shrivastava, San Jose, CA (US)

(73) Assignee: Natron Energy, Inc., Santa Clara, CA (US)

( * ) Notice: Subject to any disclaimer, the term of this patent is extended or adjusted under 35 U.S.C. 154(b) by 0 days.

(21) Appl. No.: 18/401,204

(22) Filed: Dec. 29, 2023

(65) Prior Publication Data

US 2024/0308862 A1 Sep. 19, 2024

Related U.S. Application Data

(62) Division of application No. 18/219,345, filed on Jul. 7, 2023, now Pat. No. 11,912,581.

(60) Provisional application No. 63/489,844, filed on Mar. 13, 2023.

(51) Int. Cl.
*H01B 1/10* (2006.01)
*C01C 3/11* (2006.01)
*H01M 4/58* (2010.01)
*H01M 4/02* (2006.01)

(52) U.S. Cl.
CPC ............. *C01C 3/11* (2013.01); *H01B 1/10* (2013.01); *H01M 4/58* (2013.01); *C01P 2002/52* (2013.01); *C01P 2002/72* (2013.01); *C01P 2002/76* (2013.01); *C01P 2004/03* (2013.01); *C01P 2006/40* (2013.01); *H01M 2004/021* (2013.01); *H01M 2004/028* (2013.01)

(58) Field of Classification Search
CPC .. H01B 1/00; H01B 1/04; H01B 1/10; H01M 4/04; H01M 4/049; H01M 4/136; C01C 3/11; C01C 3/12; C01C 3/0287
See application file for complete search history.

(56) References Cited

U.S. PATENT DOCUMENTS

| | | | |
|---|---|---|---|
| 4,378,995 A | 4/1983 | Gratzfeld et al. | |
| 9,531,003 B2 | 12/2016 | Lu et al. | |
| 10,899,632 B2 * | 1/2021 | Brant | H01M 4/587 |
| 11,824,194 B2 * | 11/2023 | Lu | H01M 4/0497 |
| 2015/0266745 A1 * | 9/2015 | Song | H01M 4/5825 252/182.1 |
| 2021/0046448 A1 | 2/2021 | Kanga et al. | |
| 2023/0261190 A1 | 8/2023 | Jang | |

OTHER PUBLICATIONS

Zhou et al."Hexacyanoferrate-Type Prussian Blue Analogs: Principles and Advances Toward High-Performance Sodium and Potassium Ion Batteries", Adv. Energy Mater. 2021, 11, 2000943.*

(Continued)

*Primary Examiner* — Mark Kopec
(74) *Attorney, Agent, or Firm* — Michael E. Woods; Patent Law Offices Michael E. Woods

(57) ABSTRACT

A system and method implementing and manufacturing transition metal cyanide coordination compounds (TMCCC) comprising Na, Fe, Mn, C, H, N, S, and O, wherein the TMCCC have 0-14% hexacyanometallate vacancies such as for application in electrochemical cells, including sodium ion secondary batteries.

11 Claims, 13 Drawing Sheets

(56) References Cited

OTHER PUBLICATIONS

Xi et al."Electrochemically Active Mn-Doped Iron Hexacyanoferrate as the Cathode Material in Sodium-Ion Batteries", ACS Appl. Mater. Interfaces 2022, 14, 39022-39030.*
El-Hardy et al."Vacancy and Composition Engineering of Manganese Hexacyanoferrate for Sodium-Ion Storage", ACS Appl. Energy Mater. 2022, 5, 8547-8553.*
Wu, X., Luo, Y., Sun, M., Qian, J., Cao, Y., Ai, X., & Yang, H. (2015). Low-defect Prussian blue nanocubes as high capacity and long life cathodes for aqueous Na-ion batteries. Nano Energy, 13, 117-123.
Lee, H. W., Wang, R. Y., Pasta, M., Woo Lee, S., Liu, N., & Cui, Y. (2014). Manganese hexacyanomanganate open framework as a high-capacity positive electrode material for sodium-ion batteries. Nature communications, 5(1), 1-6.).
Wu, X., Wu, C., Wei, C., Hu, L., Qian, J., Cao, Y., . . . & Yang, H. (2016). Highly crystallized Na2CoFe (CN) 6 with suppressed lattice defects as superior cathode material for sodium-ion batteries. ACS applied materials & interfaces, 8 (8), 5393-5399.].
Lim, C.Q. and Tan, Z.K., 2021. Prussian white with near-maximum specific capacity in sodium-ion batteries. ACS Applied Energy Materials, 4(6), pp. 6214-6220.
Lane, M.D., 2007. Mid-infrared emission spectroscopy of sulfate and sulfate-bearing minerals. American Mineralogist, 92(1), pp. 1-18.
Lejeune, J., Brubach, J.B., Roy, P. and Bleuzen, A., 2014. Application of the infrared spectroscopy to the structural study of Prussian blue analogues. Comptes Rendus Chimie, 17(6), pp. 534-540.
Manabe et al."Stabilization of Prussian blue using copper sulfate for eliminating radioactive cesium from a high pH solution and seawater", Journal of Hazardous Materials 386 (2020) 121979.
Jin et al "Self-assembled films of Prussian Blue and Analogues: Structure and Morphology, Elemental Composition, Film Growth, and Nanosieving of Ions", J. Phys. Chem. B 2003, 107, 12062-12070.

* cited by examiner

LOW VACANCY Fe-SUBSTITUTED Mn-BASED PRUSSIAN BLUE ANALOGUE

CROSS REFERENCE TO RELATED APPLICATIONS

This Application is a Division of U.S. application Ser. No. 18/219,345 filed on Jul. 7, 2023 now U.S. Pat. No. 11,915,581; application Ser. No. 18/219,345 claims the benefit of U.S. Provisional Application No. 63/489,844 filed on Mar. 13, 2023; and this Application claims the benefit of U.S. Provisional Application No. 63/489,844 filed on Mar. 13, 2023, the contents of which are all hereby expressly incorporated by reference thereto for all purposes.

FIELD OF THE INVENTION

The present invention relates generally to electrochemical cells including an electrochemically active coordination compound in one or more conductive structures in cells, and more specifically, but not exclusively, to an improvement in electrochemical cells having a new class of transition metal cyanide coordination compounds (TMCCC) for use, for example, in TMCCC-containing conductive structures, for example electrodes, as well as electrochemical cells made using such TMCCC-containing conductive structures, and even more specifically to transition metal cyanide coordination compounds including Na, Fe, Mn, C, H, S, N, and O, with the TMCCC have 0-14% hexacyanometallate vacancies.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Electrochemical cells play a critical role in energy storage in a variety of applications including but not limited to electric vehicles, grid storage applications, data center infrastructure, and consumer electronics. An important property of an electrochemical cell includes an ability to accumulate, hold, and release charge as needed. The application of an electrochemical cell is influenced by discharge rates at which the cell can be emptied without significant capacity loss and any change in operational characteristics of the cell by the accumulation, storage, and release of the charge.

Transition metal cyanide coordination compound (TMCCC) materials are a relatively new class of material used in secondary cells, in the present instance in sodium ion secondary batteries. TMCCC materials have a crystal structure that may include vacancies. Some performance metrics of TMCCC materials in sodium ion secondary batteries may be impacted by the presence/absence of these vacancies. Therefore, synthesis and manufacturing of TMCCC materials may desirably have mechanisms for the enhancement or suppression of vacancy formation.

In some cases, use of excess alkali ion and chelating agents may suppress vacancy formation in TMCCC synthesis. For example, Prussian white (sodium iron(II) hexacyanoferrate(II)) with a low vacancy concentration can be synthesized by acid decomposition of sodium hexacyanoferrate.

Such methods have certain disadvantages, including:
- The methods are not effective for all types of Prussian Blue Analogue (PBA), especially for Fe-substituted Mn-based TMCCC.
- Acid hydrolysis of sodium hexacyanoferrate is very slow, requires excess acid and management of an extremely toxic HCN waste stream, and allows only for one choice of TMCCC composition. The resulting material, while having high specific capacity, has lower potentials for deintercalation/intercalation of sodium ions, and battery cells made with this material therefore have lower energy density than those made with TMCCC materials in this invention.
- The common example is expensive cobalt based Prussian blue analogue.

Disclosed herein are embodiments of an invention improving upon the vacancy formation during synthesis of certain TMCCC materials.

BRIEF SUMMARY OF THE INVENTION

Disclosed is a system and method for improving upon the vacancy formation during synthesis of certain TMCCC materials. The following summary of the invention is provided to facilitate an understanding of some of the technical features related to TMCCC materials application in electrochemical cells such as sodium ion secondary batteries, as well as electrodes made with said TMCCC, as well as electrochemical cells made with said TMCCC. The invention also relates to methods of producing such TMCCC, and is not intended to be a full description of the present invention. A full appreciation of the various aspects of the invention can be gained by taking the entire specification, claims, drawings, and abstract as a whole. The present invention is applicable to other electrochemically active compounds in addition to TMCCC materials, for example other coordination materials, and to other electrically-conductive structures that include a coordination material.

An embodiment of the present invention may include transition metal cyanide coordination compound (TMCCC) materials including Na, Fe, Mn, C, H, N, S, and O, wherein the TMCCC have 0-14% hexacyanometallate vacancies.

An embodiment may include an electrochemical cell including an anode and a cathode electrode, in which the cathode electrode is made with a TMCCC represented by previous formula I: $A_xP_mP'_yP''_k[R(CN)_6]_z$ $(Vac)_r \cdot (H_2O)_n$, wherein A represents at least one alkali metal and A includes Na or K or a combination of Na and K, P, P' and P'' include a transition metal from the group consisting of iron (Fe), manganese (Mn), zinc (Zn), nickel (Ni), copper (Cu) or chromium (Cr); $R(CN)_6$ include a coordination complex from the group consisting of hexacyanoferrate, hexacyanocobaltate, hexacyanochromate, hexacyanomanganate; wherein $0<x\leq2$, $0\leq m\leq1$, $n\geq0$, $0<y\leq1$, $0<k\leq1$, $0<z\leq1$, $0\leq r\leq0.25$, and (Vac) identifies a $R(CN)_6$ vacancy, wherein $z+r=1$: (previous formula I).

An embodiment may include an electrochemical cell including an anode and a cathode electrode, in which the cathode electrode is made with a TMCCC represented by current formula I: $Na_{b1}K_{b2}Rb_{b3}Cs_{b4}Fr_{b5}Ti_{a1}V_{a2}Cr_{a3}Mn_{a4}Fe_{a5}Co_{a6}Ni_{a7}Cu_{a8}Zn_{a9}Ca_{a10}Mg_{a11}[R(CN)_6]_c$ $vac_r$ $(H_2O)_n$; wherein $R(CN)_6$ includes a coordination complex selected from the group consisting of hexacyanoferrate, hexacyanocobaltate, hexacyanochromate, and hexacyanomanganate;

wherein vac identifies an $R(CN)_6$ vacancy; wherein for at least one element of a set of alkali metal parameters $\{b1, b2\}$, $\{b1, b2\}$ is $>0$; wherein for each element of the set $\{b1, b2, b3, b4, b5\}$ excluding non-zero elements of said set of alkali metal parameters, $0 \leq \{b1, b2, b3, b4, b5\}$; wherein for each element of the set $\{b1, b2, b3, b4, b5\}$, $\{b1, b2, b3, b4, b5\} \leq 2$; wherein $b1+b2+b3+b4+b5 \leq 2$; wherein for each element of the set $\{a1, a2, a3, a4, a5, a6, a7, a8, a9, a10, a11\}$, $0 \leq \{a1, a2, a3, a4, a6, a7, a8, a9, a10, a11\} \leq 1$, $a5>0$; wherein at least two of $\{a1, a2, a3, a4, a5, a6, a7, a8, a9, a10, a11\}$ are $>0$; wherein $0<c \leq 1$; wherein $0 \leq r \leq 0.25$; wherein $c+r=1$; and wherein $n \geq 0$. (current formula I).

An embodiment may include an electrochemical cell including an anode and a cathode electrode, in which the cathode electrode is made with a TMCCC represented by formula II: $Na_{b1}K_{b2}Rb_{b3}Cs_{b4}Fr_{b5}Ti_{a1}V_{a2}Cr_{a3}Mn_{a4}Fe_{a5}Co_{a6}Ni_{a7}Cu_{a8}Zn_{a9}Ca_{a10}Mg_{a11}[R(CN)_6]_c$ $vac_r \cdot (H_2O)_n (SO_4)_j$ wherein $R(CN)_6$ includes a coordination complex selected from the group consisting of hexacyanoferrate, hexacyanocobaltate, hexacyanochromate, and hexacyanomanganate; wherein vac identifies an $R(CN)_6$ vacancy; wherein for at least one element of a set of alkali metal parameters $\{b1, b2\}$, $\{b1, b2\}>0$; wherein for each element of the set $\{b1, b2, b3, b4, b5\}$ excluding non-zero elements of said set of alkali metal parameters, $0 \leq \{b1, b2, b3, b4, b5\}$; wherein for each element of the set $\{b1, b2, b3, b4, b5\}$, $\{b1, b2, b3, b4, b5\} \leq 2$; wherein $b1+b2+b3+b4+b5 \leq 2$; wherein for each element of the set $\{a1, a2, a3, a4, a5, a6, a7, a8, a9, a10, a11\}$, $0 \leq \{a1, a2, a3, a4, a6, a7, a8, a9, a10, a11\} \leq 1$, $a5>0$; wherein at least two of $\{a1, a2, a3, a4, a5, a6, a7, a8, a9, a10, a11\}$ are $>0$; wherein $0<c \leq 1$; wherein $0 \leq r \leq 0.25$; wherein $j>0$; wherein $c+r=1$; and wherein $n \geq 0$. (formula II).

An embodiment may include an electrode including one or more conductive carbons, one or more polymer binders, a current collector, and one or more TMCCC, and optionally one or more of the following: (a) wherein the carbons include nanoparticulate carbons; (b) wherein the current collector includes a metal foil; (c) wherein the metal foil includes a surface coating including carbon; and/or (d) wherein the polymer binder include functionalized SEBS binders.

An embodiment may include an electrochemical cell, including: a cell stack having a liquid electrolyte, an anode electrode, a separator, and a cathode electrode, the electrodes electrochemically communicated with the liquid electrolyte; and optionally one or more wherein the cell stack may contain additional anode, cathode or reference electrodes; wherein the liquid electrolyte includes a polar organic solvent combined with an alkali metal salt; wherein the separator includes polymer membranes; wherein the membrane may have a surface coating including nanoparticulate alumina or boehmite; and wherein the anode electrode includes a conductive carbon.

An embodiment may include a TMCCC positive electrode material with a general composition of $A_xP_mP'_yP''_k[R(CN)_6]_z$ $(Vac)_r \cdot (H_2O)_n$ (previous formula I), wherein A represents at least one alkali metal and A includes Na or K or a combination of Na and K, P, P' and P''' include P, a transition metal from the group consisting of iron (Fe), manganese (Mn), zinc (Zn), nickel (Ni), copper (Cu) or chromium (Cr); $R(CN)_6$ includes a coordination complex from the group including hexacyanoferrate, hexacyanocobaltate, hexacyanochromate, hexacyanomanganate, wherein $0<x \leq 2$, $0 \leq m \leq 1$, $0<y \leq 1$, $0<k \leq 1$, $0<z \leq 1$, $0 \leq r \leq 0.25$, $n \geq 0$, and $(Vac)$ identifies a $R(CN)_6$ vacancy where $z+r=1$.

An embodiment may include a TMCCC positive electrode material with a general composition of $A_xP_mP'_yP''_k[R(CN)_6]_z$ $(Vac)_r \cdot (H_2O)_n (SO_4)_j$ (formula II), wherein A represents at least one alkali metal and A includes Na or K or a combination of Na and K, P, P' and P''' include P, a transition metal from the group consisting of iron (Fe), manganese (Mn), zinc (Zn), nickel (Ni), copper (Cu) or chromium (Cr); $R(CN)_6$ includes a coordination complex from the group including hexacyanoferrate, hexacyanocobaltate, hexacyanochromate, hexacyanomanganate, wherein $0<x \leq 2$, $0 \leq m \leq 1$, $n \geq 0$, $0<y \leq 1$, $0<k \leq 1$, $0<z \leq 1$, $0 \leq r \leq 0.25$, $j>0$, and $(Vac)$ identifies a $R(CN)_6$ vacancy where $z+r=1$.

An embodiment of the present invention may include an electrochemical device, including an electrically-conductive structure including a TMCCC represented by Formula II: $Na_{b1}K_{b2}Rb_{b3}Cs_{b4}Fr_{b5}Ti_{a1}V_{a2}Cr_{a3}Mn_{a4}Fe_{a5}Co_{a6}Ni_{a7}Cu_{a8}Zn_{a9}Ca_{a10}Mg_{a11}[R(CN)_6]_c$ $vac_r \cdot (H_2O)_n (SO_4)_j$ Formula II; wherein $R(CN)_6$ includes a coordination complex selected from the group consisting of hexacyanoferrate, hexacyanocobaltate, hexacyanochromate, and hexacyanomanganate; wherein vac identifies an $R(CN)_6$ vacancy; wherein for at least one element of a set of alkali metal parameters $\{b1, b2\}$, $\{b1, b2\}>0$; wherein for each element of the set $\{b1, b2, b3, b4, b5\}$ excluding non-zero elements of said set of alkali metal parameters, $0 \leq \{b1, b2, b3, b4, b5\}$; wherein for each element of the set $\{b1, b2, b3, b4, b5\}$, $\{b1, b2, b3, b4, b5\} \leq 2$; wherein $b1+b2+b3+b4+b5 \leq 2$; wherein for each element of the set $\{a1, a2, a3, a4, a5, a6, a7, a8, a9, a10, a11\}$, $0 \leq \{a1, a2, a3, a4, a6, a7, a8, a9, a10, a11\} \leq 1$, $a5>0$; wherein at least two of $\{a1, a2, a3, a4, a5, a6, a7, a8, a9, a10, a11\}$ are $>0$; wherein $0<c \leq 1$; wherein $0 \leq r \leq 0.25$; wherein $j>0$; wherein $c+r=1$; and wherein $n \geq 0$.

An embodiment of the present invention may include a method of producing a TMCCC Formula II material, including the steps of: (a) Admixing a solvent additive, a sodium salt and water to produce a first reaction mixture; (b) Admixing an iron(III) source, a manganese(II) source and a first solvent to produce a second reaction mixture; (c) Admixing a sodium hexacyanoferrate(II) source, a potassium hexacyanoferrate(III) source and a second solvent to produce a third reaction mixture; (d) Contacting said second reaction mixture and said third reaction mixture to said first reaction mixture to produce a TMCCC; (e) Admixing a buffer and said TMCCC to produce a fourth reaction mixture; and (f) Contacting said fourth reaction mixture with a sulfur-containing reducing agent to produce a Prussian white TMCCC including the Formula II material.

Advantages of some embodiments of the present invention include: (i) an ability to combine high specific capacity with higher cell voltage, resulting in greater possible cell energy density; (ii) use of inexpensive reagents; (iii) a practical, inexpensive, and efficient method that can be scaled up at industrial scale; and (iv) results in a batch-to-batch reproducibility of well controlled particle size production of corresponding TMCCC materials.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies. Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
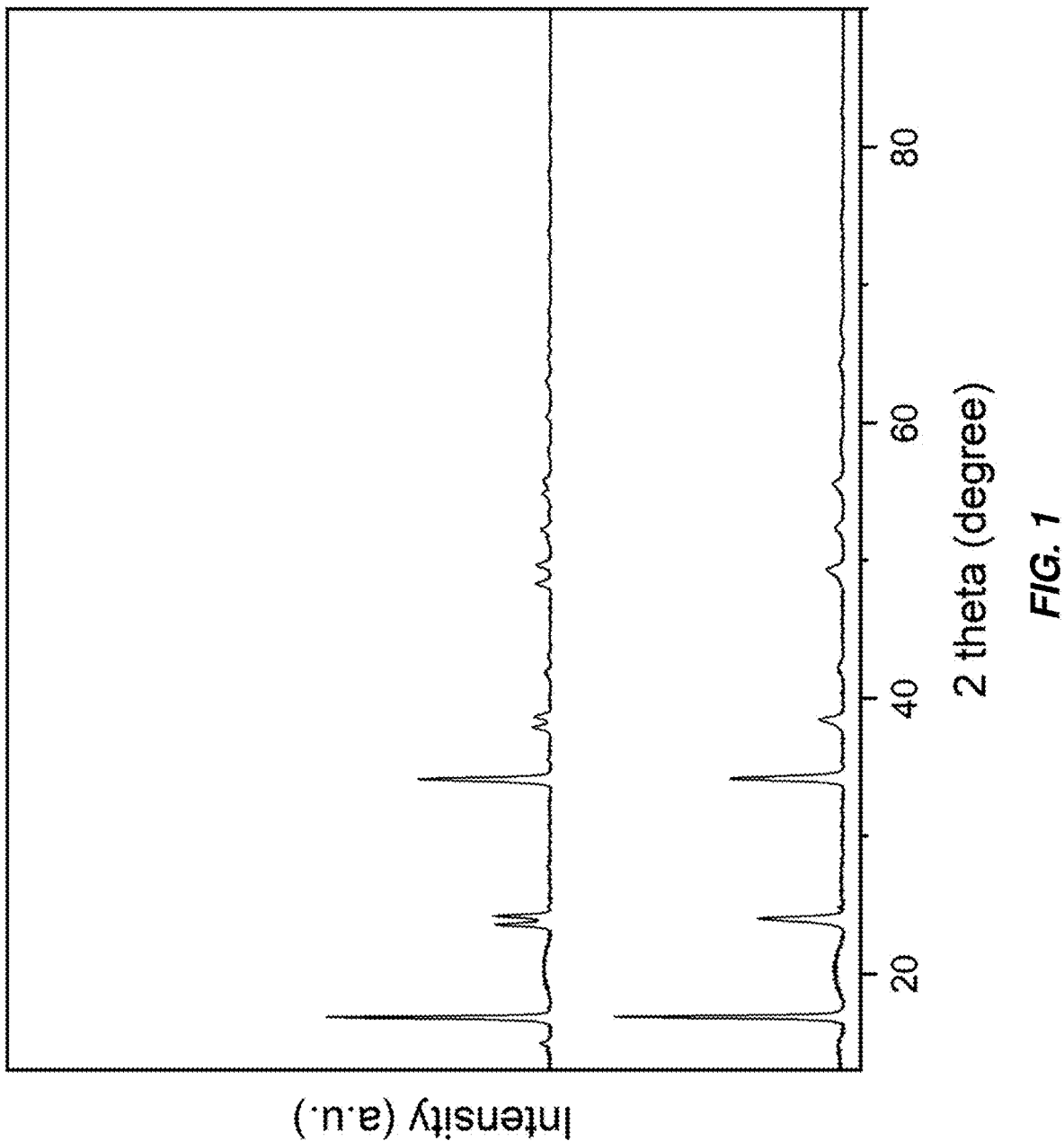
FIG. 1 illustrates an X-ray diffraction (XRD) pattern for Example 1 (cubic Phase, Prussian blue) and Example 5 (monoclinic phase, Prussian White)

Embodiments of the present invention provide a system and method for implementing and manufacturing a hierarchy system for use with a TMCCC-containing electrically-conductive structure (e.g., an electrode) as well as methods for use and manufacturing of such structures and electrochemical cells including these devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The following definitions apply to some of the aspects described with respect to certain embodiments of the invention. These definitions may likewise be expanded upon herein.

As used herein, the term "or" includes "and/or" and the term "and/or" includes any and all combinations of one or more of the associated listed items.

Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "hybrid capacitor" means an electrochemical device in which one electrode includes an active material that stores ions in the bulk of the particles by undergoing a Faradaic reaction (a reaction in which the oxidation or valence state changes). Examples include TMCCC, graphite, hard carbon, and ceramics such as oxides and phosphates. That electrode is the "battery electrode". However, a second electrode in the device is only capacitive. This means that charge can build up on the surface as the electrode is taken to a more extreme electrochemical potential, but there is never a Faradaic reaction. Combination of one Faradaic electrode and one capacitive electrode creates a device having desirable properties such as fast discharge and recharge ability or long cycle life. An electrochemical cell including two electrodes, one including a TMCCC material, may include a case of a hybrid capacitor. A unique attribute is that one of the electrodes undergoes a non-Faradaic charge storage reaction.

The TMCCC materials described herein may be used in an electrode in an electrochemical cell. The electrochemical cell may also include additional electrodes, an electrolyte and a separator membrane. Any additional electrodes may include a second TMCCC material, a carbon material such as activated charcoal, hard carbon, or graphite, or another material. The electrolyte may include one or more organic solvents such as acetonitrile, cyclic or linear carbonates, or other organic solvents, or water. The separator membrane may contain polymers and may have surface coating included but not limited to nano-alumina, and boehmite.

As used herein, the term "electrode" in the context of an electrochemical cell may have different meanings and sometimes encompass different sets of components of the electrochemical cell in different contexts and different audiences. For example, the electrode, as comprised by the TMCCC, carbon, and binder, as well as the solvents used in the slurry processing to make the electrode, is typically considered to be entirely separate from a current collector. This electrode structure could be deposited on any number of current collectors having different compositions (aluminum, copper, etc.) or mechanical properties (thickness, surface roughness, and the like). One precise definition would be to refer to an "electrode" as comprising two components: both an "active layer" or "electrode composite" including the TMCCC, carbons, and binders, as well as a current collector, which may in turn have subcomponents such as a special surface coating, or special design features such as physical dimensions.

The present application has adopted a special term used herein to avoid some imprecision that is present when referring to an electrode of an electrochemical cell. This term is "electrically conductive structure" and includes electrodes as well as other electrochemically-active structures that may be used as an electrode. Some larger structures that encompass an electrode may also be such an "electrically conductive structure" within the meaning of the present application, unless the context would reasonably suggest otherwise to a person having ordinary skill in the art apprised of this disclosure and understanding of the discussion and claims presented herein.

Electrochemical performance of Prussian blue is closely related to its intrinsic crystal structure. It is known that during the conventional precipitation process, large amounts of Fe(CN)6 vacancies occupied by coordinated water will exist in the crystal framework. Vacancies as a positively charged defects significantly reduce the specific capacity and cause structural instability. This invention describes a novel TMCCC synthesis method for electrochemical energy storage devices, in which water molecules are prevented from coordinating to the under-coordinated transition metal ion adjacent to the vacancy, using small molecules.

To suppress the formation of vacancy prior inventions have described methods that involve a slow chemical precipitation (REF1), use of excess alkali ion (REF2) and citrate-assisted controlled synthesis (REF3) of PBAs.

None of these references (REF1-REF3 describe a scalable synthesis or composition of TMCCC having cubic or monoclinic structure such as illustrated in FIG. 1 and TMCCC cathode material having three different oxidation-reduction potentials for nitrogen-coordinated $Fe^{2+/3+}$, carbon-coordinated $Fe^{2+/3+}$, and nitrogen-coordinated $Mn^{2+/3+}$ with 3-14% vacancy.

Table 1 summarizes a set of elemental compositions of different TMCCC provided in the following examples.

TABLE 1

| Example | $Na^+$ | $Mn^{2+}$ | $Fe^{2+}$ | $Fe^{3+}$ | $[Fe(CN)_6]^{4-}$ | Vacancy | Water |
|---|---|---|---|---|---|---|---|
| 1 | 1.43 | 0.76 | 0 | 0.24 | 0.93 | 0.07 | 2.65 |
| 2 | 1.33 | 0.76 | 0 | 0.24 | 0.90 | 0.10 | 0.12 |
| 3 | 1.69 | 0.97 | 0.03 | 0 | 0.92 | 0.077 | 1.72 |
| 4 | 1.65 | 0.82 | 0 | 0.18 | 0.97 | 0.03 | 0.53 |
| 5 | 1.66 | 0.74 | 0.20 | 0.06 | 0.93 | 0.07 | 1.69 |
| 6 | 1.55 | 0.74 | 0.23 | 0.03 | 0.9 | 0.103 | 1.61 |
| 7 | 1.53 | 0.66 | 0.28 | 0.06 | 0.90 | 0.10 | 1.67 |
| 8 | 1.16 | 0.77 | 0 | 0.23 | 0.86 | 0.14 | 3.13 |
| 9 | 1.53 | 0.79 | 0.21 | 0 | 0.88 | 0.12 | 1.65 |
| 10 | 1.86 | 0.97 | 0.03 | 0.00 | 0.96 | 0.036 | 1.64 |

Some embodiments of the present invention relate to a simple and cost-effective method of synthesis of low vacancy Prussian blue by using 1-40% additives such as ethylene glycol, and other bifunctional compounds containing at least one hydroxyl and/or amine functional group to produce high quality Fe and Mn TMCCC materials.

Also, some embodiments of the present invention describe a synthesis method in which a novel class of sulfur-containing reducing agents is used to convert low vacancy Prussian blue to Prussian white with high sodium content for electrochemical energy storage devices.

REF4 and REF5 describe a use of anti-oxidants or reducing agents for the synthesis of sodium iron(II)-hexacyanoferrate(II) $(Na_{1+x}Fe[Fe(CN)_6]_z \cdot m\ H_2O)$.

Numerous attempts to reduce TMCCC materials with a mixed composition containing Fe(III) and Mn(II) with hydrazine sulfate, forming gas, sodium boron hydride, ascorbic acid, sodium thiosulphate and sodium hypophosphite have failed to produce a corresponding Prussian white material.

Some embodiments of the present invention generally relate to electrochemical cells and, more particularly, to methods for synthesizing low vacancy sodium rich Fe-substituted Mn-based TMCCC of the general formula $A_xP_y[R(CN)_6]_z$ $(Vac)_r$ $(H_2O)$, $SO_4)_j$, for use in battery electrodes. This general formula is described herein in two embodiments—current formula I wherein j=0 and formula II wherein j>0.

Figure 2:
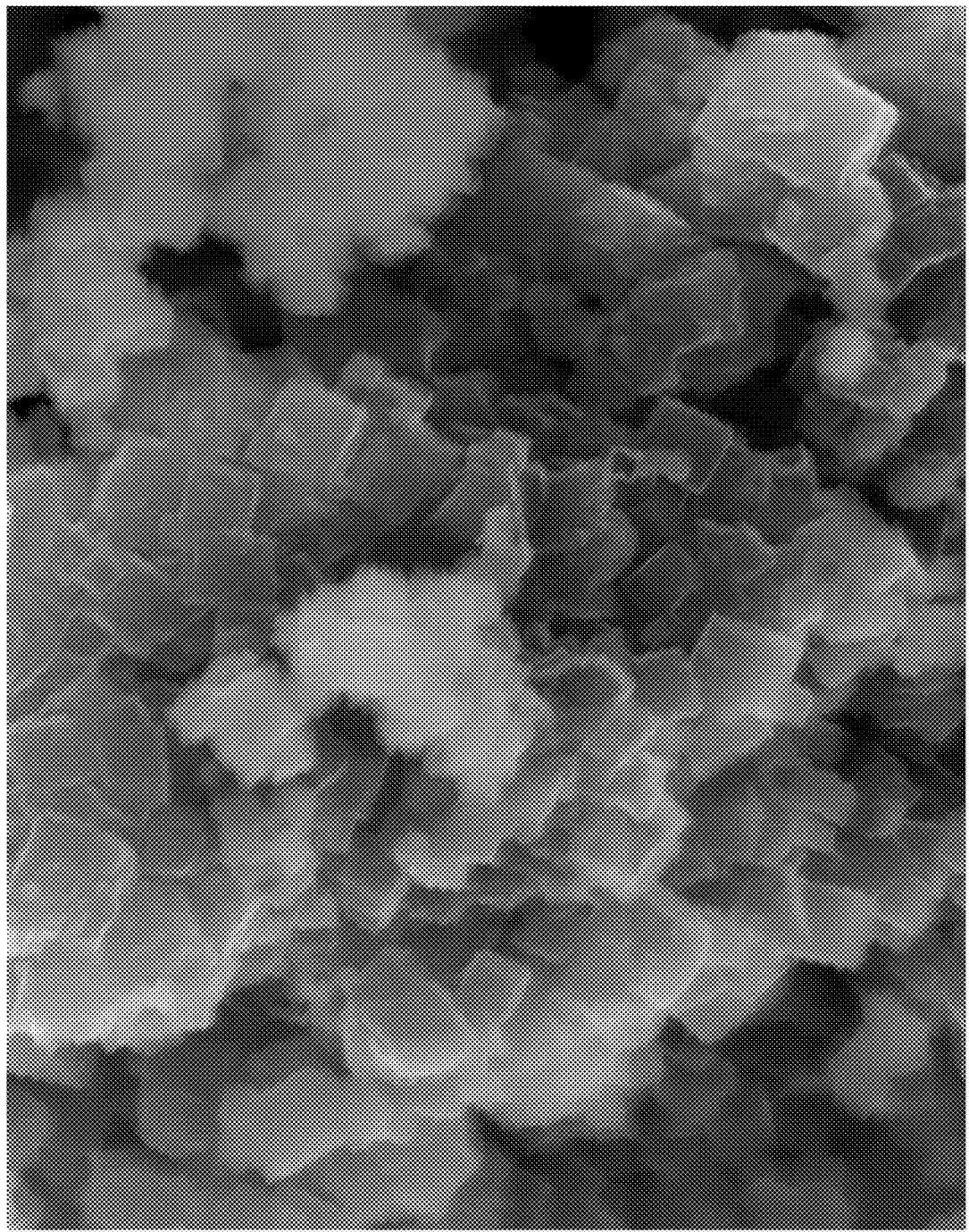
FIG. 2 illustrates a scanning electron microscope (SEM) image of Example 1.
Figure 3:
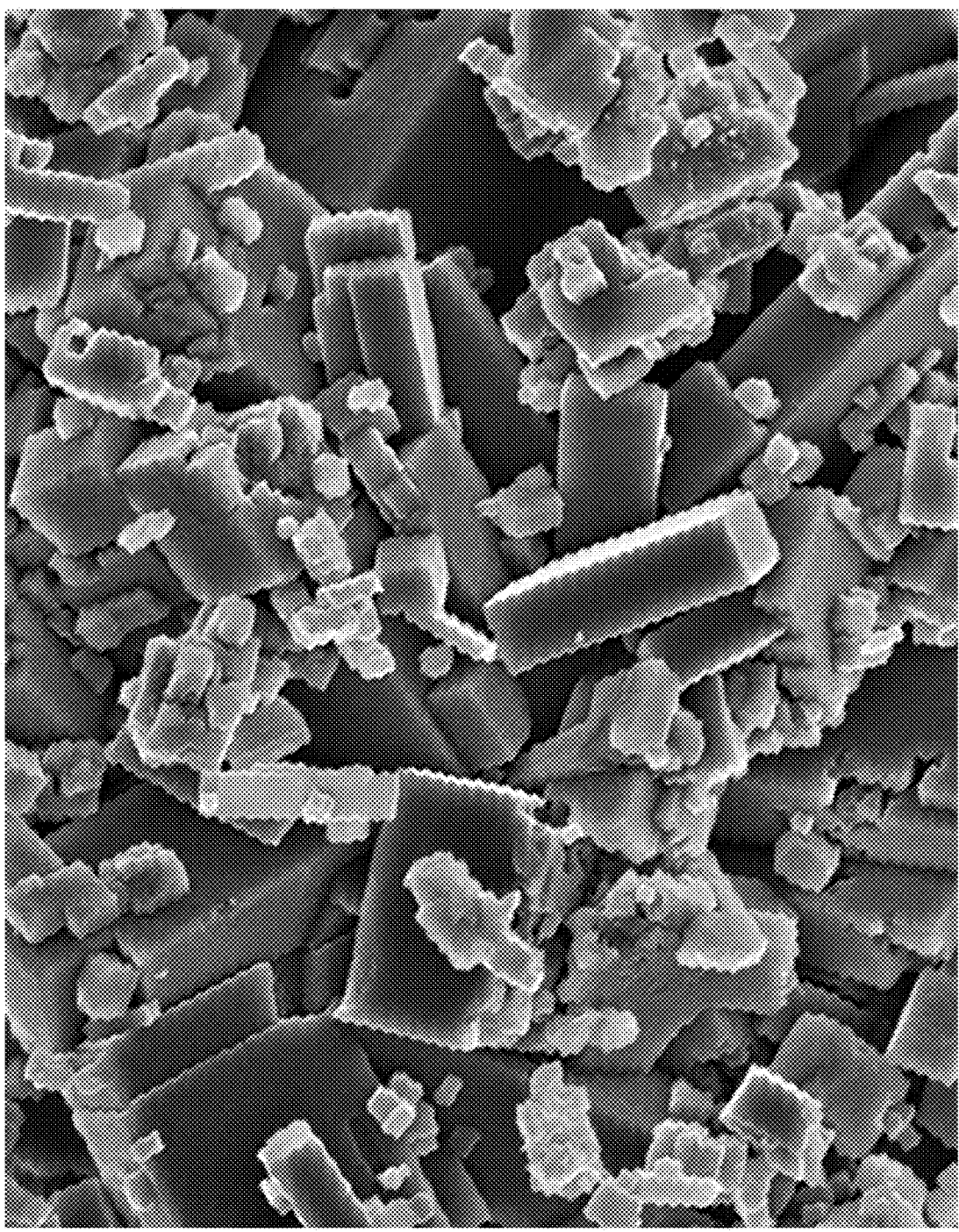
FIG. 3 illustrates a scanning electron microscope (SEM) image of Example 3.
Figure 4:
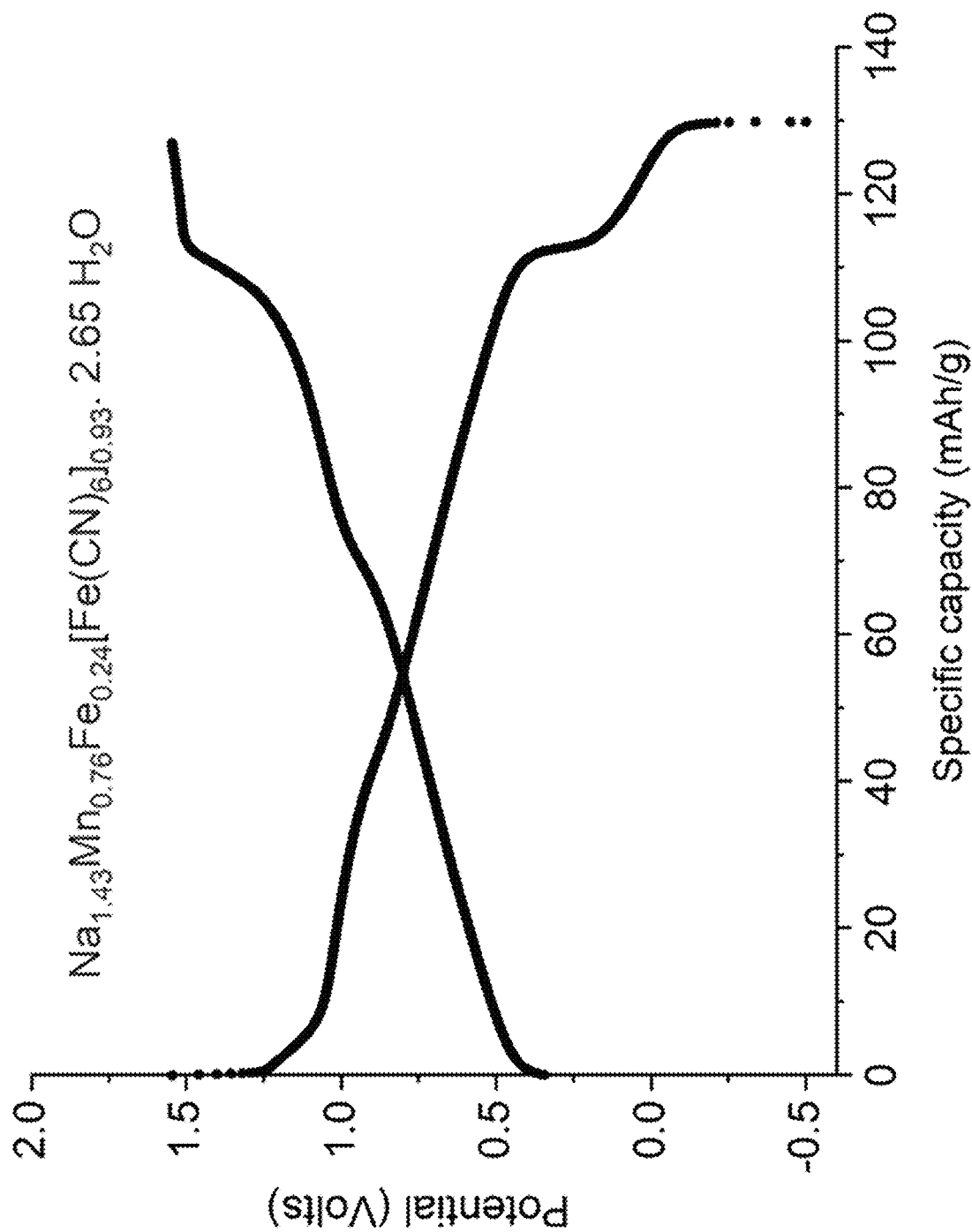
FIG. 4 illustrates a graph representing electrochemical behavior of Example 1.
Figure 5:
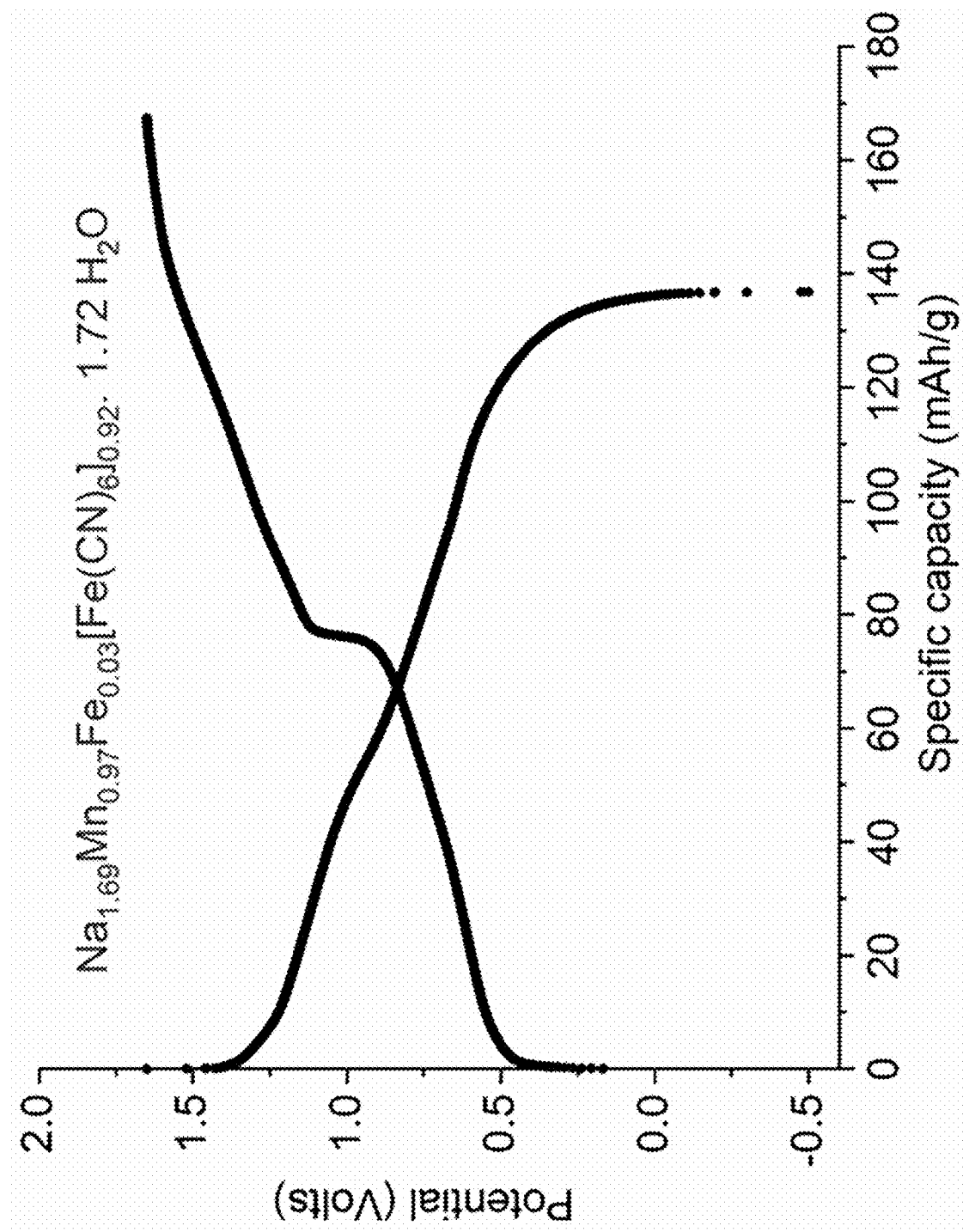
FIG. 5 illustrates a graph representing electrochemical behavior of Example 3.
Figure 6:
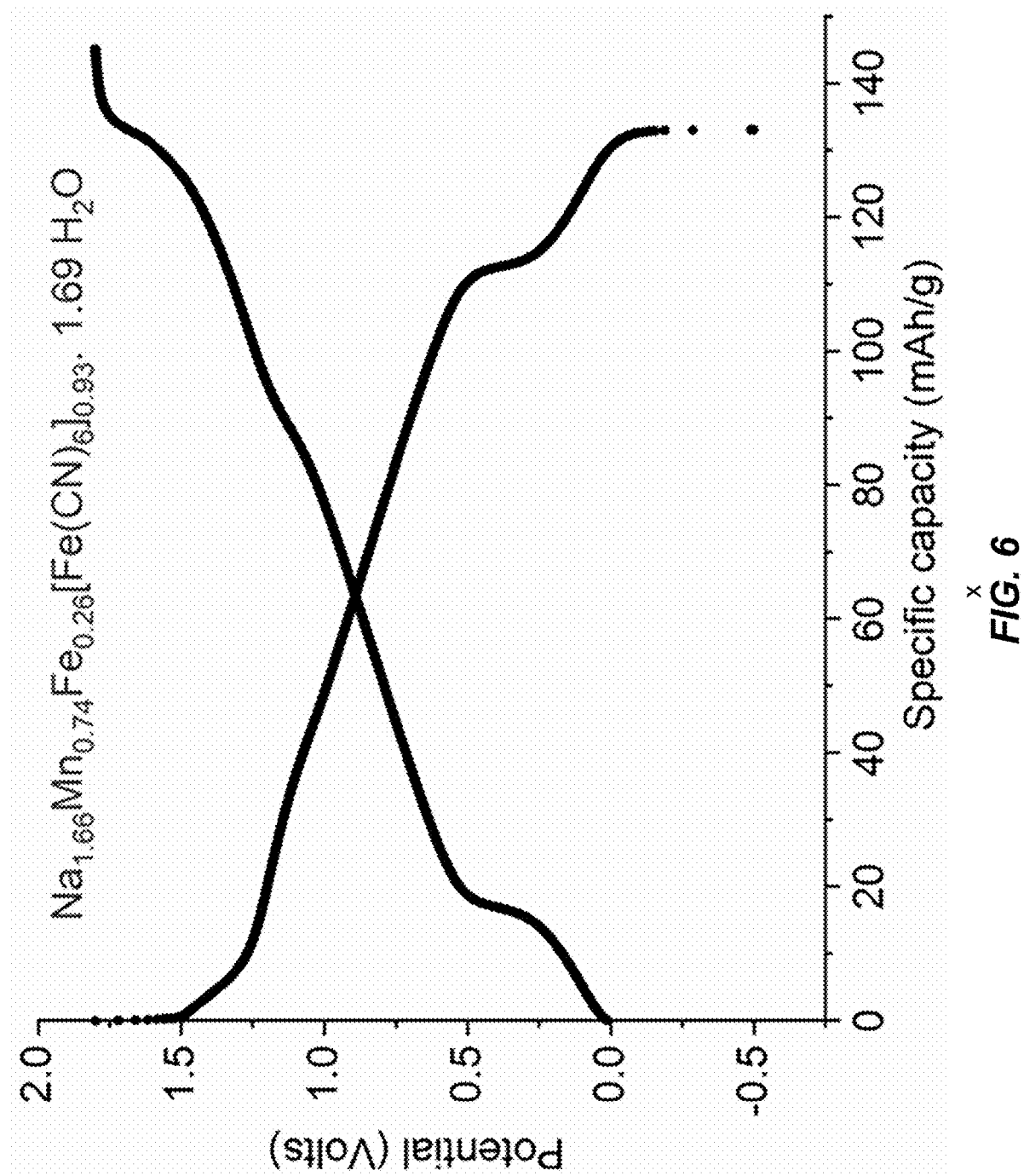
FIG. 6 illustrates a graph representing electrochemical behavior of Example 5.
Figure 7:
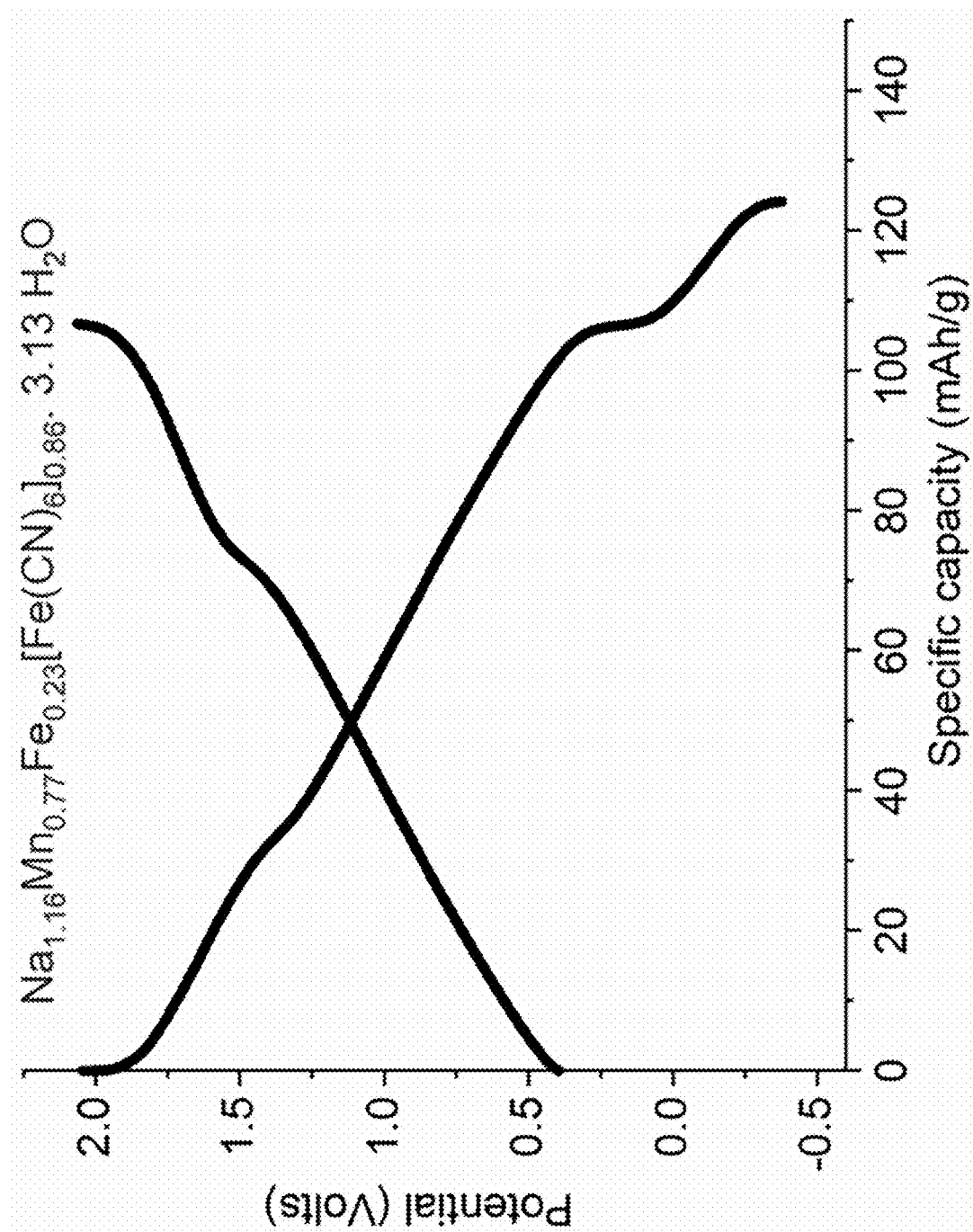
FIG. 7 illustrates a graph representing electrochemical behavior of Example 8.
Figure 8:
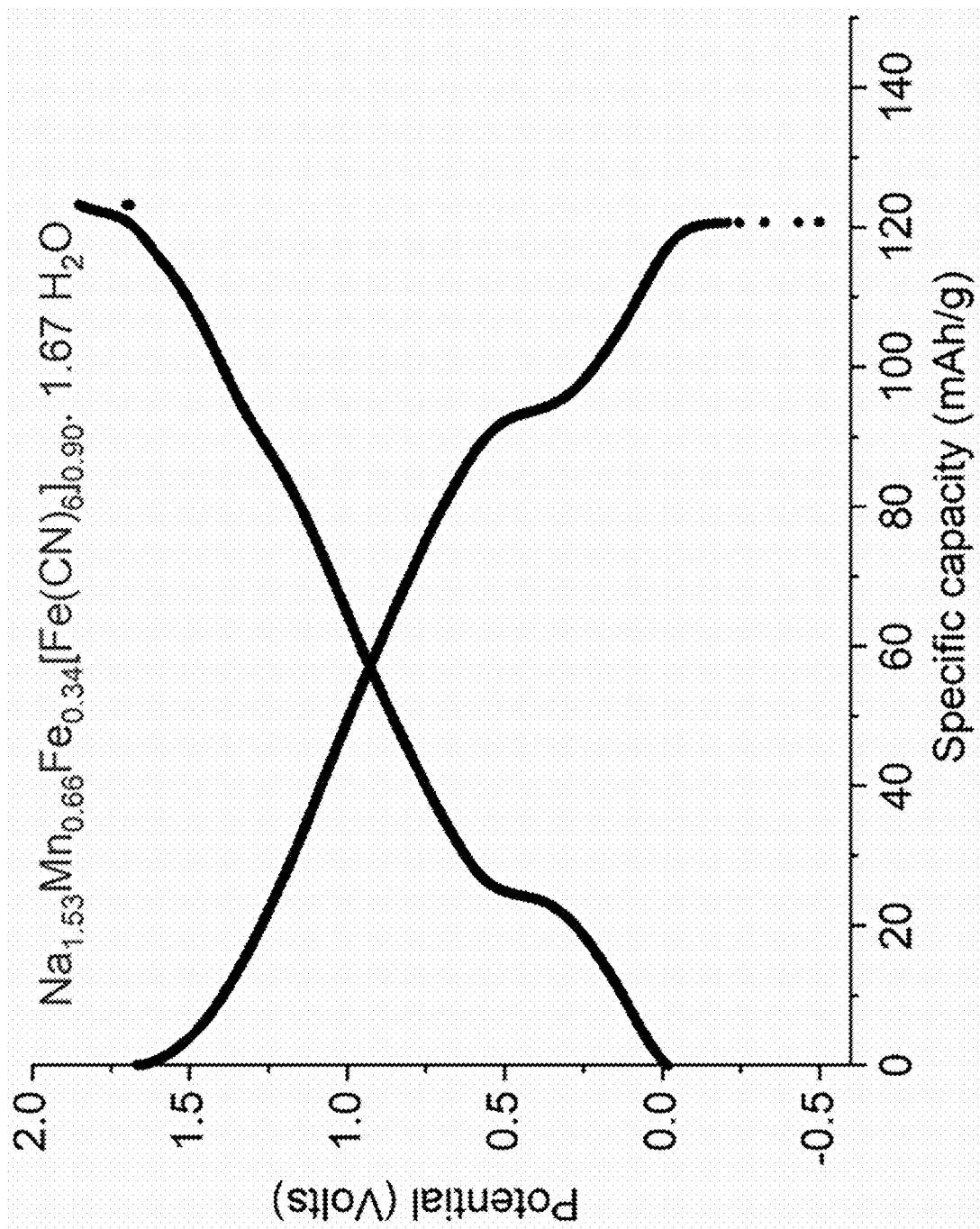
FIG. 8 illustrates a graph representing electrochemical behavior of Example 7.
Figure 9:
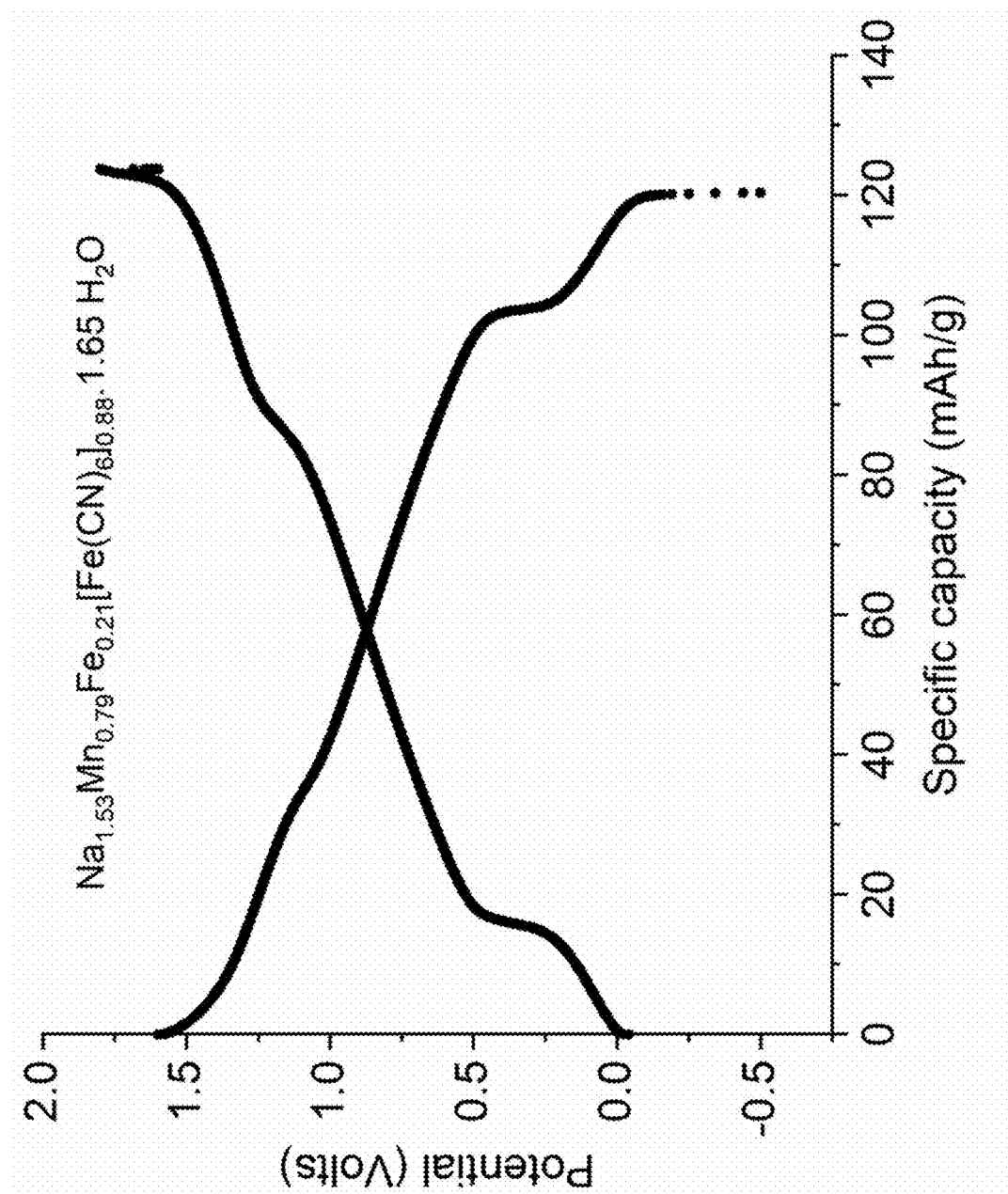
FIG. 9 illustrates a graph representing electrochemical behavior of Example 9.

This cathode material is mostly prepared by co-precipitation method where a mixed solution of iron(iii) and another metal ion in water and an aqueous ferrocyanide solution are simultaneously added to a reaction vessel that has been pre-charged with liquid containing the bifunctional compound and/or water. The particle morphology (See FIG. 2 and FIG. 3) may be controlled by choosing optimal addition time, stirring speed, concentration and temperature to result in low vacancy Prussian blue (a TMCCC material in which the metal ions in P include Fe with a ratio of $Fe^{3+}/(Fe^{3+}+Fe^{2+}) \geq 1.0$). The reduction of Prussian blue to Prussian white (a TMCCC in which the metal ions include Fe with a ratio of $Fe^{3+}/(Fe^{3+}+Fe^{2+}) \leq 0.25$) involves use of buffer and reducing agents.

The prepared materials exhibit high capacity (reference FIG. 4-FIG. 9 and FIG. 13) and facilitate a commercialization of sodium ion battery. Moreover, this synthetic strategy may be extended to other coordination-framework materials for a wide range of energy conversion and storage applications.

Figure 11:
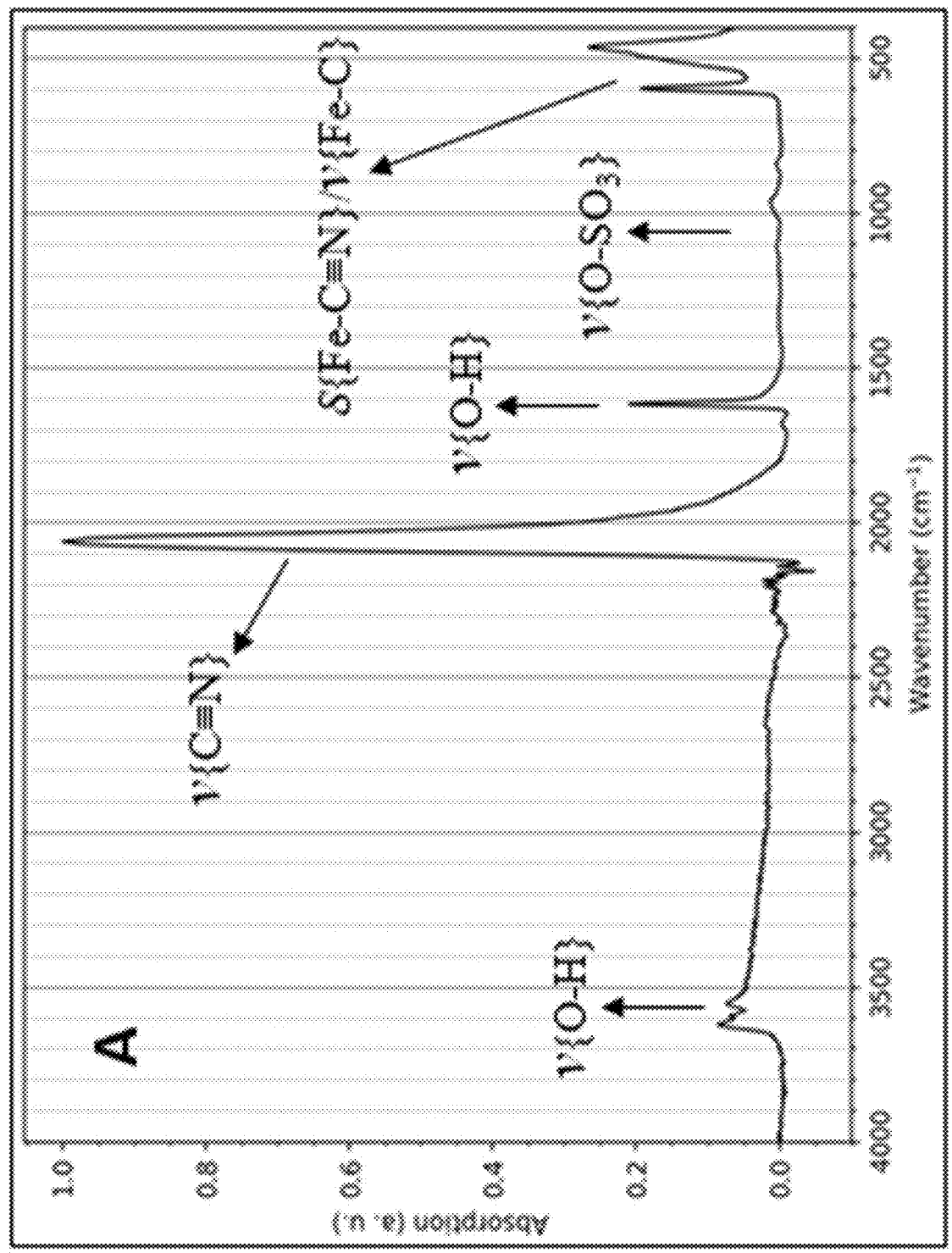
FIG. 11 illustrates a Fourier-transform infrared (FTIR) spectrum of Example 8 including an assignment of the IR vibration bands of TMCCC (normalized for better visibility of sulfate vibrational features)
Figure 12:
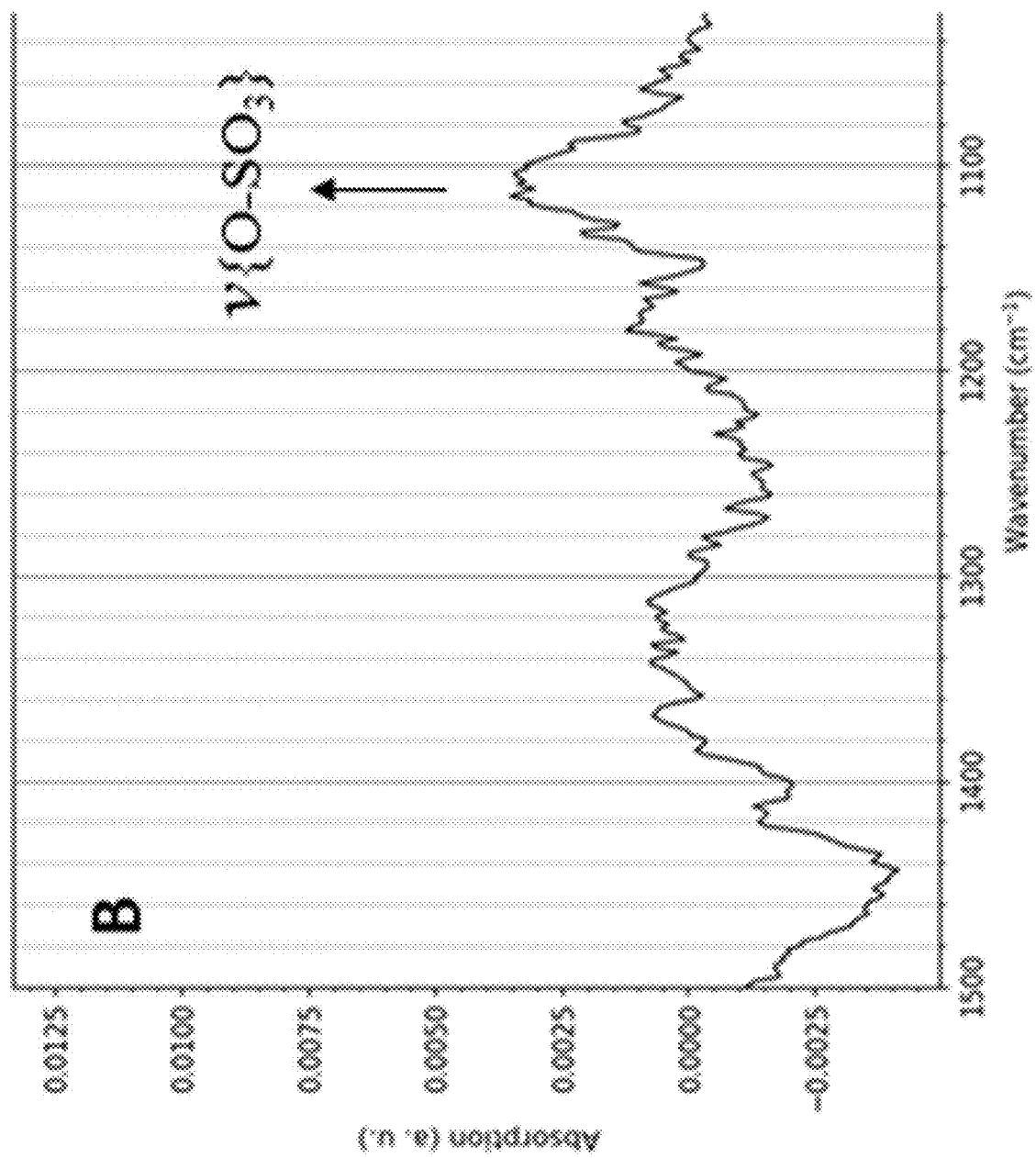
FIG. 12 illustrates a Fourier-transform infrared (FTIR) spectrum of Example 8 including a strongest sulfate peak around 1100 $cm^{-1}$ shown enlarged (normalized for better visibility of sulfate vibrational features)
Figure 13:
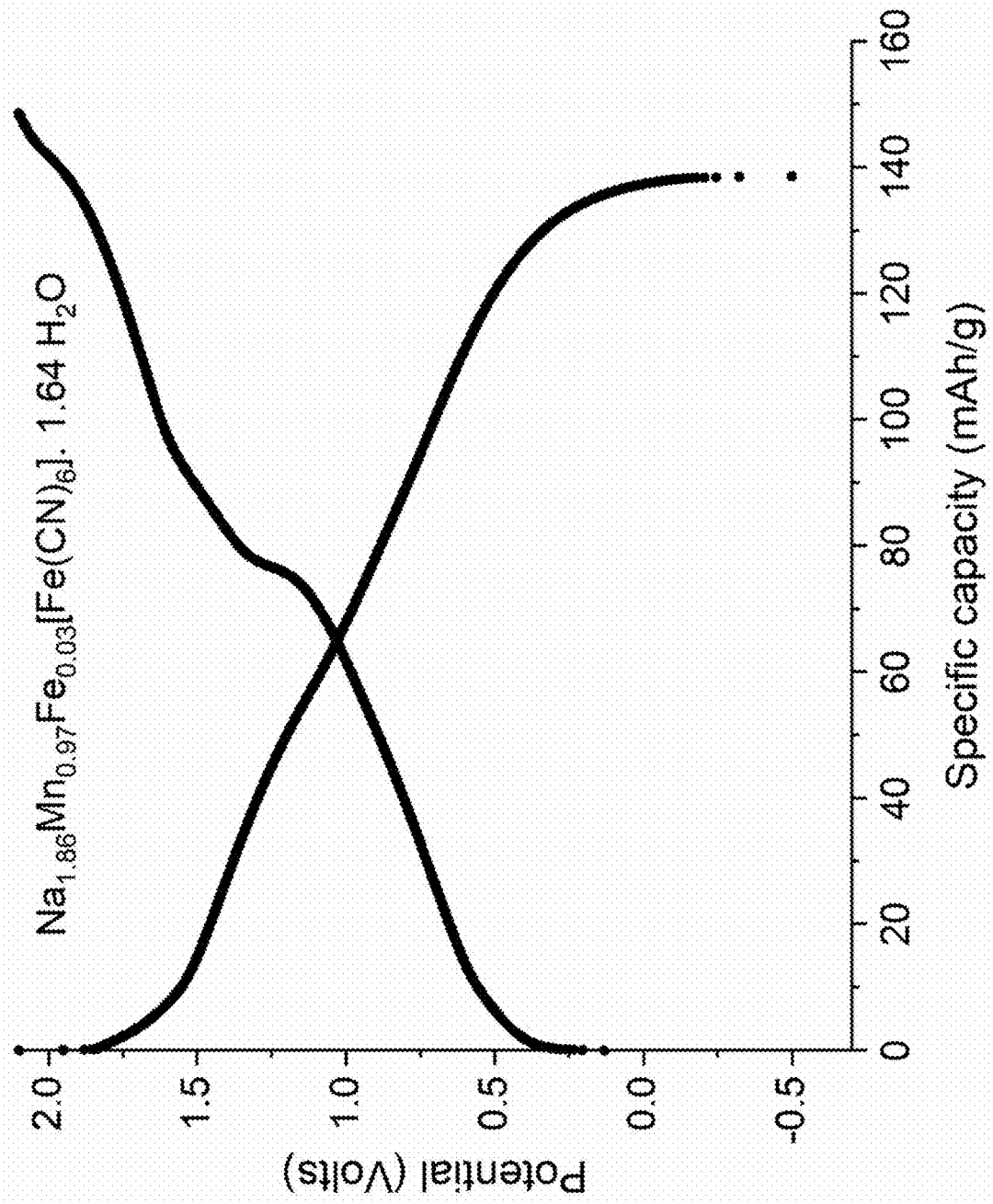
FIG. 13 illustrates a graph representing electrochemical behavior of Example 11.

As indicated in a general composition of $A_xPmP'_yP''_k[R(CN)_6]_z$ $vac_r \cdot (H_2O)_n$ $(SO_4)_j$ the disclosed TMCCC of formula II contains sulfate and the assignment of the IR vibration bands of the TMCCC is exhibited in FIG. 11 and FIG. 12. A detailed discussion of the IR spectrum of sulfate and Prussian blue analogues can be found in REF6 and REF7.

Some embodiments herein report a new method of preparing low vacancy content Prussian blue, Prussian white and demonstrate its application in a sodium-ion battery.

EXPERIMENTAL SECTION

Example 1

To a stirred pre-charge of ethylene glycol (209.25 g), a solution of iron(III) sulfate hydrate (20.09 g) and manganese (II) sulfate monohydrate (45.17 g) in water (154.93 g) and a homogenous solution of sodium hexacyanoferrate(II) decahydrate (131.14 g), sodium sulfate (2.08 g) and potassium hexacyanoferrate(III) (0.13 g) in water (399.9 g) were added at constant rate over 120 minutes at 80° C. The reaction mixture was then stirred for 1 hour, and subsequently filtered and washed with water (1×150 g and 1×368 g) and methanol (143 g). The isolated material was dried at 80° C. under vacuum for 18 hours and a blue powder was obtained.

Example 2

To a stirred solution of ethylene glycol (52.31 g) in water (156.9 g) and sodium sulfate (2.08 g), a solution of iron(III) sulfate hydrate (20.09 g) and manganese(II) sulfate monohydrate (45.17 g) in water (154.93 g) and a homogenous solution of sodium hexacyanoferrate(II) decahydrate (131.14 g) and potassium hexacyanoferrate(III) (0.13 g) in water (399.9 g) were added at constant rate over 120 min at 80° C. The solution was then aged for 1 hour, and subsequently filtered and washed with water (1×150 g and 1×368 g) and methanol (143 g). The isolated material was dried at 80° C. under vacuum for 18 hours and a blue powder was obtained.

Example 3

To a stirred solution of ethanolamine (52.31 g) in water (156.9 g) and sodium sulfate (2.08 g), a solution of iron(III) sulfate hydrate (20.09 g) and manganese(II) sulfate monohydrate (45.17 g) in water (154.93 g) and a homogenous solution of sodium hexacyanoferrate(II) decahydrate (131.14 g) and potassium hexacyanoferrate(III) (0.13 g) in water (399.9 g) were added at constant rate over 120 min at 80° C. The solution was then aged for 1 hour, and subsequently filtered and washed with water (1×150 g and 1×368 g) and methanol (143 g). The isolated material was dried at 80° C. under vacuum for 18 hours and powder was obtained.

Then the dried powder (20 g) was added to a 1 L reactor containing succinic acid (5.8 g), sodium hydroxide (1.8 g) and water (100 g). After mixing thoroughly, sodium dithionite (18.8 g) was added. The reaction mixture was then stirred for 15 minutes and subsequently filtered and washed with water (1×27 g) and methanol (12 g) to yield Prussian white powder. The isolated material was dried at 80° C. under vacuum in inert atmosphere for 18 hours.

Example 4

A reactor pre-charge was made by charging ethylene glycol (52.31 g), iron(III) sulfate hydrate (20.09 g) and manganese(II) sulfate monohydrate (45.17 g) to a 1 L reactor under inert atmosphere. The mixture was then heated to 150° C. and held for 30 minutes to purge out the water content of the hydrated precursor salts. Then, the mixture was cooled to room temperature and used as pre-mixed reagent.

To a stirred solution of said pre-mixed reagent, sodium sulfate (2.08 g) and water (312 g), a homogenous solution of sodium hexacyanoferrate(II) decahydrate (131.14 g) and potassium hexacyanoferrate(III) (0.13 g) in water (399.9 g) were added at constant rate over 120 minutes at 80° C. The solution was then aged for 1 hour, and subsequently filtered and washed with water (1×150 g and 1×368 g) and methanol (143 g). The isolated material was dried at 80° C. under vacuum for 18 hours and a blue powder was obtained.

Example 5

20 g of TMCCC material synthesized in example 1 was added to a 1 L reactor containing succinic acid (5.8 g), sodium hydroxide (1.8 g) and water (100 g). After the mixture was stirred for 5 minutes, a reducing agent sodium dithionite (18.8 g) was added. Then mixture was stirred for 15 minutes to complete the reaction, and subsequently filtered and washed with water (27 g) and methanol (12 g). The isolated material was dried at 80° C. under vacuum in inert atmosphere for 18 hours and a white powder was obtained.

Example 6

20 g of TMCCC material synthesized in example 2 was added to a 1 L reactor containing succinic acid (5.8 g), sodium hydroxide (1.8 g) and water (100 g). After the mixture was stirred for 5 minutes, a reducing agent sodium dithionite (18.8 g) was added. Then mixture was stirred for 15 minutes to complete the reaction and subsequently filtered and washed with water (27 g) and methanol (12 g). The isolated material was dried at 80° C. under vacuum in inert atmosphere for 18 hours and a white powder was obtained.

Example 7

A 1 L jacketed reactor equipped with a mechanical stirrer was charged with water (50 g), ascorbic acid (6.5 g), anhydrous sodium sulfate (1.72 g) and ethylene glycol (121.5 g), and the resulting solution was stirred at 200 r.p.m at 65° C. under N2 atmosphere. Then 2% of the sulfate precursor solution was added over one minute.

To control particle morphology, seeding was achieved by simultaneous addition of "hexacyanoferrate" solution (1.50 mL) and "sulfate solution" (0.52 mL) over 0.5 minutes.

To this mixture, the remaining "hexacyanoferrate" solution and "sulfate solution" were simultaneously added dropwise over a period of 120 minutes. The solution was then aged for 1 hour, and subsequently filtered and washed with water (1×150 g) and methanol (80 g). The isolated material was dried at 80° C. under vacuum in inert atmosphere for 18 hours and a white powder with a very light blue tint was obtained.

"sulfate" solution preparation: Under inert atmosphere, a mixture of iron(II) sulfate heptahydrate (21.06 g) and manganese(II) sulfate monohydrate (34.88 g) and water (115 g) were stirred for 240 minutes.

"hexacyanoferrate" solution preparation: under inert atmosphere, a mixture of sodium hexacyanoferrate(II) decahydrate (97.5 g), potassium hexacyanoferrate(III) (0.094 g) and water (303.6 g) were stirred for 60 minutes.

Example 8

The same as example 1, except ethylene glycol was replaced by equal amount of water.

Example 9

Prussian blue powder (20 g) synthesized with no small molecules as additive was added to a 1 L reactor containing succinic acid (5.8 g), sodium hydroxide (1.8 g) and water (100 g). After the mixture was stirred for 5 minutes, sodium dithionite (18.8 g) was added. The mixture was stirred for 15 minutes to complete the reaction.

The reaction mixture was filtered, and the powder was washed with water (1×27 g) and then with methanol (12 g) to yield a white powder. This powder was then dried under reduced pressure at 80° C. for 18 h.

Example 10

To a stirred solution of triethanolamine (52.31 g) in water (156.9 g) and sodium sulfate (2.08 g), a solution of iron(III) sulfate hydrate (20.09 g) and manganese(II) sulfate monohydrate (45.17 g) in water (154.93 g) and a homogenous solution of sodium hexacyanoferrate(II) decahydrate (131.14 g) and potassium hexacyanoferrate(III) (0.13 g) in water (399.9 g) were added at constant rate over 120 min at 80° C. The solution was then aged for 1 hour, and subsequently filtered and washed with water (1×150 g and 1×368 g) and methanol (143 g). The isolated material was dried at 80° C. under vacuum for 18 hours and powder was obtained.

Then the dried powder (20 g) was added to a 1 L reactor containing succinic acid (5.8 g), sodium hydroxide (1.8 g) and water (100 g). After mixing thoroughly, sodium dithionite (18.8 g) was added. The reaction mixture was then stirred for 15 minutes and subsequently filtered and washed with water (1×27 g) and methanol (12 g) to yield Prussian white powder. The isolated material was dried at 80° C. under vacuum in inert atmosphere for 18 hours.

Figure 10:
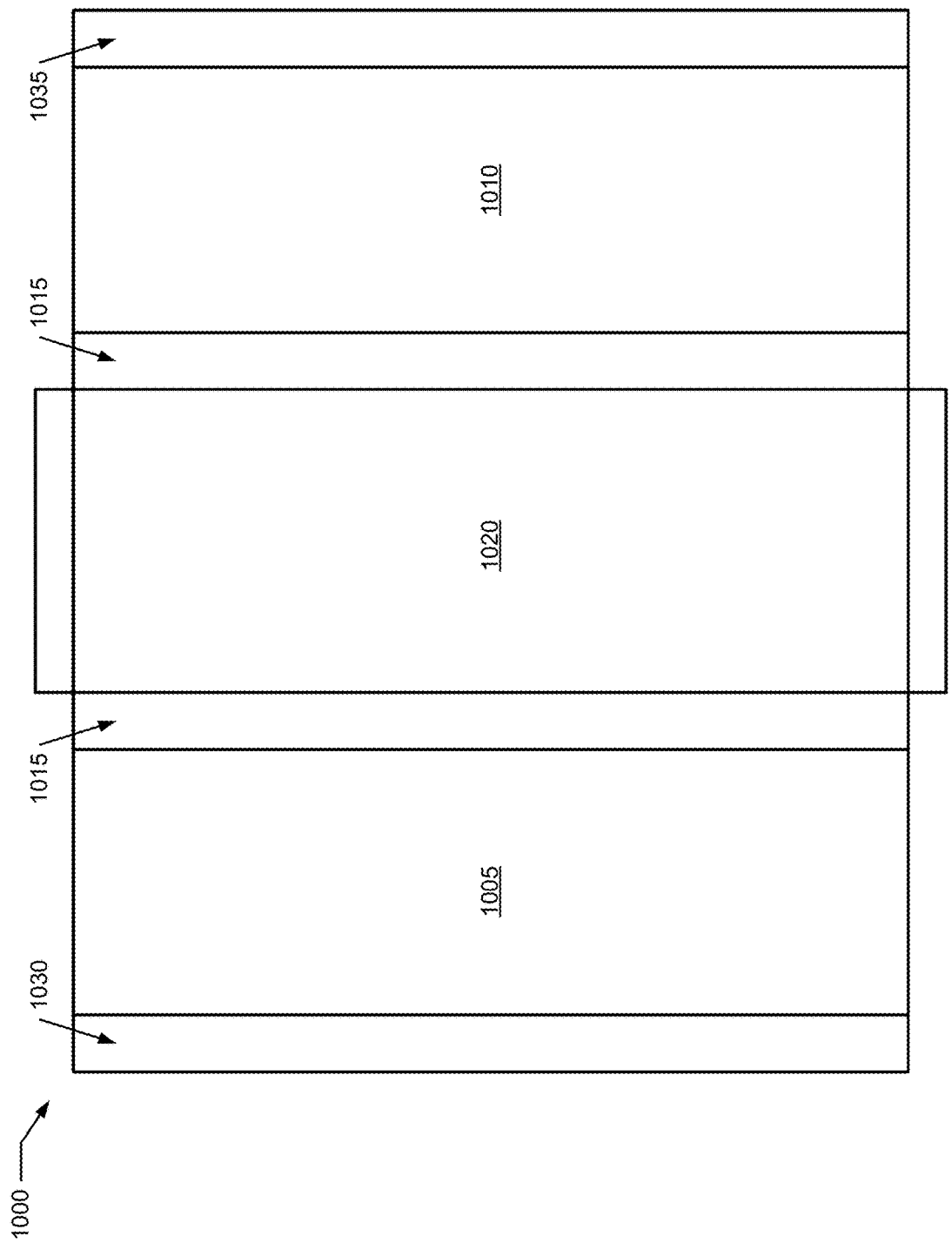
FIG. 10 illustrates a generic TMCCC electrochemical cell.

FIG. 10 illustrates a generic electrochemical cell 1000. Cell 1000 includes a first electrode 1005 (e.g., a cathode electrode), a second electrode 1010 (e.g., an anode electrode), a liquid electrolyte 1015, a separator 1020, a first current collector 1025, and a second current collector 1030. One or both of the electrodes includes a coordination compound, and more specifically a transition metal cyanide coordination compound. Separator 1020 includes a set of characteristics as further set forth herein.

REFERENCES

The following references are cited herein, and each of which is hereby expressly incorporated by reference thereto in its entirety for all purposes:
REF1: Wu, X., Luo, Y., Sun, M., Qian, J., Cao, Y., Ai, X., & Yang, H. (2015). Low-defect Prussian blue nanocubes as high capacity and long life cathodes for aqueous Na-ion batteries. Nano Energy, 13, 117-123.
REF2: Lee, H. W., Wang, R. Y., Pasta, M., Woo Lee, S., Liu, N., & Cui, Y. (2014). Manganese hexacyanomanganate open framework as a high-capacity positive electrode material for sodium-ion batteries. Nature communications, 5(1), 1-6.)
REF3: Wu, X., Wu, C., Wei, C., Hu, L., Qian, J., Cao, Y., . . . & Yang, H. (2016). Highly crystallized $Na_2CoFe(CN)_6$ with suppressed lattice defects as superior cathode material for sodium-ion batteries. ACS applied materials & interfaces, 8(8), 5393-5399.]
REF4: Lim, C. Q. and Tan, Z. K., 2021. Prussian white with near-maximum specific capacity in sodium-ion batteries. ACS Applied Energy Materials, 4(6), pp. 6214-6220.
REF5: Lu, Y. and Vail, S. A., Sharp Laboratories of America Inc, 2016. Sodium iron (II)-hexacyanoferrate (II) battery electrode. U.S. Pat. No. 9,531,003.)

The system and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case.

One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment.

Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate.

As indicated, these modifications may be made to the present invention in light of the foregoing description of illustrated embodiments of the present invention and are to be included within the spirit and scope of the present invention. Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention.

It is intended that the invention is not limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A method of producing a TMCCC Formula II material, comprising the steps of:
  (a) Admixing a solvent additive, a sodium salt and water to produce a first reaction mixture;
  (b) Admixing an iron (III) source, a manganese (II) source and a first solvent to produce a second reaction mixture;
  (c) Admixing a sodium hexacyanoferrate (II) source, a potassium hexacyanoferrate (III) source and a second solvent to produce a third reaction mixture;
  (d) Contacting said second reaction mixture and said third reaction mixture to said first reaction mixture to produce a TMCCC;
  (e) Admixing a buffer and said TMCCC to produce a fourth reaction mixture; and
  (f) Contacting said fourth reaction mixture with a sulfur-containing reducing agent to produce a Prussian white TMCCC including the Formula II material; and
  wherein said Formula II includes:
  $Na_{b1}K_{b2}Rb_{b3}Cs_{b4}Fr_{b5}Ti_{a1}V_{a2}Cr_{a3}Mn_{a4}Fe_{a5}CO_{a6}Ni_{a7}Cu_{a8}Zn_{a9}Ca_{a10}Mg_{a11}[R(CN)_6]_c vac_r(H_2O)_n(SO_4)_j$
  wherein $R(CN)_6$ includes a coordination complex selected from the group consisting of hexacyanoferrate, hexacyanocobaltate, hexacyanochromate, and hexacyanomanganate; wherein vac identifies an $R(CN)_6$ vacancy; wherein for at least one element of a set of alkali metal parameters $\{b1, b2\}$, $\{b1, b2\}>0$; wherein for each element of the set $\{b1, b2, b3, b4, b5\}$ excluding non-zero elements of said set of alkali metal parameters, $0 \leq \{b1, b2, b3, b4, b5\}$; wherein for each element of the set $\{b1, b2, b3, b4, b5\}$ $\{b1, b2, b3, b4, b5\} \leq 2$; wherein $b1+b2+b3+b4+b5 \leq 2$; wherein for each element of the set $\{a1, a2, a3, a4, a5, a6, a7, a8, a9, a10, a11\}$, $0 \leq \{a1, a2, a3, a4, a6, a7, a8, a9, a10, a11\} \leq 1$, $a5>0$; wherein at least two of $\{a1, a2, a3, a4, a5, a6, a7, a8, a9, a10, a11\}$ are $>0$; wherein $0<c \leq 1$; wherein $0 \leq r \leq 0.25$; wherein $j>0$; wherein $c+r=1$; and wherein $n \geq 0$.

2. The method of claim 1, wherein said solvent additive is selected from the group consisting of ethylene glycol, sorbitol, ethanolamine, succinonitrile, acetonitrile, Triethanolamine, Triethanolamine borate, 1-Aminopropan-2-ol, glycerol, 2-aminoethanethiol, 2-Mercaptoethanol, acetic anhydride, propane-1,2-diol, 1,3-Propanediol, 1,2-Butanediol, 1,4-Butanediol, 1,3-Butanediol, 2,2-Bis(hydroxymethyl)-2,2',2"-nitrilotriethanol, 1,3-Bis[tris(hydroxymethyl)methylamino]propane, 2-Amino-2-(hydroxymethyl)-1,3-propanediol, N,N-Bis(2-hydroxyethyl)glycine, 3-(N,N-Bis[2-hydroxyethyl]amino)-2-hydroxypropanesulfonic acid, 2-Amino-2-methyl-1,3-propanediol, 1,2-Diaminoethane, or mixtures thereof.

3. The method of claim 1, wherein said solvent additive is selected from a nitrogen-containing heterocyclic compound, Hydroxylamine, primary amines, secondary amine, tertiary amine, alcohol, or mixtures thereof.

4. The method of claim 1, wherein said iron (III) source is selected from $Fe_2(SO_4)_3(H_2O)_k$ wherein $k \geq 0$, or $FeSO_4 \cdot xH_2O$ wherein $x \geq 0$, or mixtures thereof.

5. The method of claim 1, wherein said manganese (II) source is selected from $MnSO_4 \cdot yH_2O$ wherein $y \geq 0$ or mixtures thereof.

6. The method of claim 1, wherein said buffer is prepared from sodium hydroxide and succinic acid.

7. The method of claim 1, wherein said sulfur-containing reducing agent is selected from the group consisting of sodium dithionite, tetraethylammonium dithionite, sodium hydroxymethanesulfinate, thiourea dioxide and N,N-dimethyl thiourea dioxide, or mixtures thereof.

8. The method of claim 1 wherein said solvents in (b) and (c) are selected from the group consisting of water, methanol, ethanol, ethylene glycol, or mixtures thereof.

9. The method of claim 1, wherein one or more of said steps of admixing are performed at a temperature between about 20° C. and about 150° C.

10. The method of claim 1, wherein said Prussian white in (f) includes a TMCCC comprising of Na, Fe, Mn, C, H, N, S, and O.

11. The method of claim 1, wherein said TMCCC in (f) includes a TMCCC with monoclinic, rhombohedral, cubic crystal structure, or mixtures thereof.

\* \* \* \* \*